United States Patent Office 3,704,171
Patented Nov. 28, 1972

3,704,171
CATALYTIC MEMBRANE AIR ELECTRODES FOR FUEL CELLS AND FUEL CELLS CONTAINING SAME
Henry Patrick Landi, Yorktown Heights, N.Y., assignor to American Cyanamid Company, Stamford, Conn.
No Drawing. Filed May 18, 1970, Ser. No. 38,573
Int. Cl. H01m 29/02
U.S. Cl. 136—86 A                              5 Claims

ABSTRACT OF THE DISCLOSURE

Diffusion electrodes for fuel cells, and particularly suitable for metal-air fuel cells comprise two layers of porous sheet material laminated with a conductor screen. Both porous layers comprise polytetrafluoroethylene (PTFE) binder with partial filler of a low-melting resin incorporated to effect lamination at temperature below the sintering temperature of PTFE. One layer is a conductive porous electrode layer with fillers of carbon and silver. The other is a porous backing layer with filler of polyolefin fibers. The electrodes are especially suited as air electrodes for cells requiring low cost materials and long service life.

---

The invention relates to improvements in catalytic, gas diffusion electrodes, and to fuel cells, particularly of the metal-air type, having air diffusion electrodes comprising such improvements.

Porous, air-permeable, membranes of several kinds, having catalytic metal within the porous membrane structure, are known for use as air diffusion electrodes in fuel cells and particularly in metal air batteries. Such electrodes are necessarily porous but must be sufficiently impermeable to the aqueous electrolyte solution in the cell to prevent leakage of the electrolyte through the membrane. The membrane must admit both the electrolyte from one side and air from the other side for contact with catalytic metal within the membrane to sustain the catalytic cathode reaction of oxygen with electrolyte components. The electrode must of course be sufficiently electroconductive for the electrode function.

My U.S. Pat. No. 3,407,096 described porous membrane electrodes having a catalyst-coated conductive filler such as carbon bound in a porous unsintered web of fibrillated polytetrafluoroethylene (PTFE). Current collector metal screens were imbedded in some of those electrode sheets. My U.S. Pat. No. 3,407,249 described porous sheets comprising any of several fillers which are non-electron-conducting bound with a porous web of fibrillated PTFE. The electrodes of the present invention are laminated structures which comprise an electrode of the kind described in my U.S. Pat. No. 3,407,096, with some modifications not specifically described there, laminated with a current collecting screen and a porous backing sheet of the kind described in my U.S. Pat. No. 3,407,249, also having some modifications not specifically described there. The respective sheets are made by methods essentially the same as the methods described in those two patents, with certain variations and modifications and then those two sheets are laminated with a conducting screen to make an electrode of the present invention.

An object of the invention is to provide an effective air electrode for fuel cells at lowest practical cost per unit. This is particularly important in metal air batteries in which the electrode costs are critical to economic feasibility.

Electrode costs are reduced by most economic use of the more expensive electrode-making materials, viz the polytetrafluoroethylene binder and the catalytic metal, and by substitution of less expensive materials where practical.

Use of a laminated structure having two waterproofing porous layers provides the necessary impermeability to aqueous electrolyte solution while only one of the two waterproofing layers needs to contain the expensive catalyst metal. Lamination is accomplished by incorporating a low melting thermoplastic resin as an adhesive filler in each of the two porous layers. This resin has a fusion temperature well below the sintering temperature of PTFE, preferably in the range from about 100° to about 250° C. Then by compressing the two layers together at such lower fusion temperature, the two layers are bonded by the low melting adhesive without sintering the PTFE binder and without clogging the pores of the sheets.

In accordance with the invention there is provided an air diffusion electrode for metal-air batteries and the like having a laminated structure comprising a porous electrode layer, a metal screen impressed against one of its surfaces and a porous backing layer bonded to the electrode layer with the metal screen between the two bonded sheets. The electrode layer comprises an electroconductive network of carbon particles, at least part of which have catalytic silver deposited on the carbon surfaces, bound by a web of fibrillated polytetrafluoroethylene. Also incorporated in this electrode sheet is a thermoplastic resin which has a melting point substantially below the sintering point of polytetrafluoroethylene, present primarily to function as an adhesive for lamination.

The metal screen serves as a current collector for the carbon sheet and may be of any suitable metal. We prefer an expanded metal screen of nickel but other metals resistant to corrosion by the electrolyte will be suitable. The backing layer is a sheet comprising mixed resin fillers consisting of polypropylene fibers and the same low-melting resin adhesive for lamination as that used in the electrode sheet, all bound in a web of fibrillated polytetrafluoroethylene.

Following is a detailed example illustrating fabrication of a laminated air diffusion electrode embodying the invention.

EXAMPLE 1

Preparation of the catalytic electrode layer

On a two-roll rubber mill having heated rolls is melted 766 gms. polymethylmethacrylate (PMMA). This resin is obtained commercially by the trade name Acrylite BM 131 beads. A plasticizer, dicyclohexylphthalate (DCHP) obtained under the trade name Kronisol 201 is added to the melt in the amount of 510 gms. and thoroughly blended. As the melt is continuously milled, there are then added 14.8 gms. (solid weight) of colloidal polytetrafluoroethylene in aqueous suspension obtained as Du Pont Teflon 30B which is a 60 percent solids colloidal dispersion. Then catalyzed carbon is added in the amounts of 126 gms. This catalyzed carbon consists of 20 percent by weight silver deposited on carbon black. Also added is 52 gms. of 50 percent compressed acetylene black selected to improve conductivity of the carbon network in this sheet. As the blend is still being continuously milled there is added 14.8 gms. of a copolymer of hexafluoropropylene-tetrafluoroethylene obtained as FEP–F160 powder from Liquid Nitrogen Processing Corporation. This is the thermoplastic adhesive component, having melting point about 230° C. as a powder. The milling is continued for about 10 minutes to thoroughly blend the ingredients. As the mixture is worked on the rolls a cohesive non-tacky sheet forms on one of the rolls as a web of the fibrillated PTFE is developed throughout the mass. This sheet is removed and cut into smaller sections which are formed by compression in a heated press to the desired electrode thickness, in this case the thickness is 30 mils. The formed sheets are then immersed in a suitable solvent to extract the PMMA resin and DCHP plasticizer. The extraction solvent for this example is acetone. The sheets after extraction are washed in water to remove the solvent and then thoroughly dried. The product is a flexible porous catalytic electroconductive sheet comprising silver and carbon and the adhesive resin bound in the fibrillated PTFE web. Catalytic silver had been previously deposited on the surface areas of the carbon black by conventional chemical reduction in situ using silver nitrate solution to imbibe carbon black slurried in the solution followed by heating and sodium borohydride solution which causes depoposition of reduced silver on the slurried carbon. The silver loading in the carbon electrode sheet is about one gm. silver per square foot of electrode area.

PREPARATION OF THE POROUS BACKING SHEET

This sheet is prepared by the same method used above to make the electrode sheet except the PTFE dispersion is added in the amount of 22.4 gms. (solid weight) and the FEP resin is aded as an aqueous colloidal dispersion, Du Pont FEP #120 dispersion, in the amount of 112.4 gms. (solid weight). No carbon or silver is added. Polypropylene fiber is added as filler in the amount of 90 gms. of polypropylene mono-filament floc cut to ¼ inch filament length. The sheet is pressed to 30 mils thickness before extraction.

LAMINATION

A screen of annealed expanded metal, Exmet 5 Ni 10-2/0 is flattened and cut to the same area as the electrode sheet prepared above. This screen is placed between a sheet of the porous electrode material and a sheet of the backing material prepared above and the laminate is slowly pressed between calender rolls heated to 200° C. A sheet of asbestos paper or PTFE felt is placed between the porous backing sheet and the heated roll as cushioning. The rolls are compressed at 20 lb. per inch width of the laminate. At this temperature and pressure the FEP resin in the two porous sheets is softened and fused at the contacting surfaces to form an adhesive bond. There is adequate space between the screen wires for surfaces of the porous sheets to contact and bond through the screen.

The sheets are thus firmly laminated by the melting adhesive resin without clogging the porous sheets and without loss of air permeability across the bonded interface. The bonding temperatures for lamination are low enough to avoid sintering the PTFE web in the porous sheets. The laminated electrode can be used as an air diffusion electrode in hydrogen fuel cells, zinc-air batteries. and iron-air batteries. This electrode is particularly well suited for use as the air electrode in certain rechargeable metal-air batteries, in which the air cathode is disconnected from the circuit during electrical charge, because of its long service life and relative economy of construction. The laminated air diffusion electrode prepared above is employed as the air cathode in a laboratory model hydrogen fuel cell having a conventional hydrogen fuel cell anode and using 25% KOH aqueous electrolyte. At room temperature, using hydrogen fuel and untreated room air as the oxidant gas, the cell is discharged spontaneously through a simple resistive load at a rate of 50 milliamperes per square centimeter of air cathode area (about 50 amperes per sq. ft.). A cell of the same description, having a measured internal resistance of 0.040 ohm, is discharged continuously for 1000 hours at 50 ma./cm.$^2$ cathode area at voltage of 0.73 v. initial decreasing to 0.67 v. at 1000 hours. Air electrodes of the same desecription are operated as air cathodes in zinc-air cells and iron-air cells, with comparable performance characteristics. This electrode is particularly suited to use in these metal-air fuel cells because of its optimized economy and efficiency.

I claim:

1. A laminated air diffusion membrane electrode comprising a porous electrode layer comprising catalyst metal and carbon, a metal screen intermediate layer in electrical contact with said electrode layer, and a porous gas-permeable backing layer, said layers being laminated in an integral composite sheet with said metal screen layer between said other two layers;

the said catalyst and carbon electrode layer consisting essentially of a cohesive sheet bound with an unsintered web of fibrillated polytetrafluoroethylene having fillers comprising a metal catalyst for the electrolytic reduction of oxygen, an electroconductive network of carbon and an adhesive thermoplastic resin having melting point below the sintering temperature of said polytetrafluoroethylene;

the said metal screen having openings sufficient to permit circulation of gas through the composite sheet and to permit contact of the porous sheet surfaces through the screen;

the said porous gas-permeable layer consisting essentially of a coherent sheet bound with an unsintered web of unsintered fibrillated polytetrafluoroethylene having fillers comprising polypropylene fibers and the same adhesive thermoplastic resin.

2. A metal-air fuel cell comprising a negative electrode of electroactive consumable metal, a positive electrode consisting essentially of a laminated electrode defined by claim 1, and an aqueous electrolyte contacting said negative electrode and also contacting the electrode layer of said positive electrode, the backing layer of said positive electrode being exposed for contact with a supply of air.

3. A metal-air fuel cell defined by claim 2 wherein said electroactive metal of said negative electrode is zinc.

4. A metal-air fuel cell defined by claim 2 wherein said electroactive metal of said negative electrode is iron.

5. A composite electrode defined by claim 1 further comprising as part of the filler in said carbon electrode layer catalytic silver deposited on the surface area of said carbon particles.

References Cited

UNITED STATES PATENTS

| | | | |
|---|---|---|---|
| 3,407,096 | 10/1968 | Landi | 136—120 FC |
| 3,407,249 | 10/1968 | Landi | 264—49 |
| 3,527,616 | 9/1970 | Landi | 136—86 FC |

WINSTON A. DOUGLAS, Primary Examiner

H. A. FEELEY, Assistant Examiner

U.S. Cl. X.R.

136—120 FC, 86 D